Figure 1:
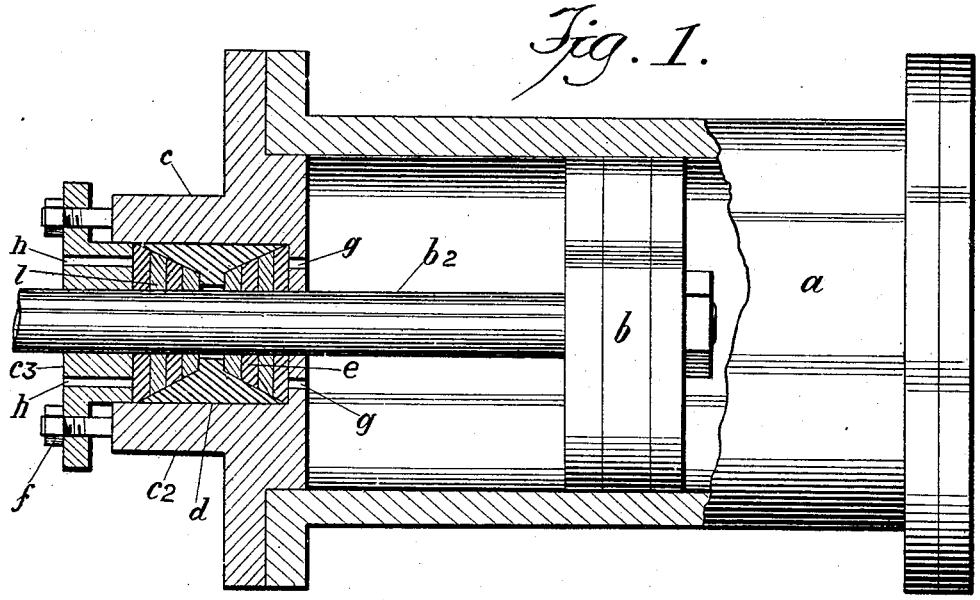

No. 859,326. PATENTED JULY 9, 1907.
C. P. McMULLEN.
PACKING BOX.
APPLICATION FILED NOV. 20, 1906.

WITNESSES
INVENTOR
Charles P. McMullen
BY Edgar Tate & Co.
ATTORNEYS

UNITED STATES PATENT OFFICE.

CHARLES P. McMULLEN, OF BROOKLYN, NEW YORK.

PACKING-BOX.

No. 859,326.  Specification of Letters Patent.  Patented July 9, 1907.

Application filed November 20, 1906. Serial No. 344,188.

*To all whom it may concern:*

Be it known that I, CHARLES P. MCMULLEN, a citizen of the United States, and residing at Brooklyn, in the county of Kings and State of New York, have invented certain new and useful Improvements in Packing-Boxes for Piston-Rods, Valve-Rods, and the Like, of which the following is a specification, such as will enable those skilled in the art to which it appertains to make and use the same.

This invention relates to packing boxes and packings for piston rods, valve rods and the like; and the object thereof is to provide a device of this class of improved construction whereby the packing will be compressed and made tight by pressure from the interior of a cylinder, valve casing or the like.

The invention is fully disclosed in the following specification, of which the accompanying drawing forms a part, in which the separate parts of my improvement are designated by suitable reference characters in each of the views, and in which;—

Figure 2:
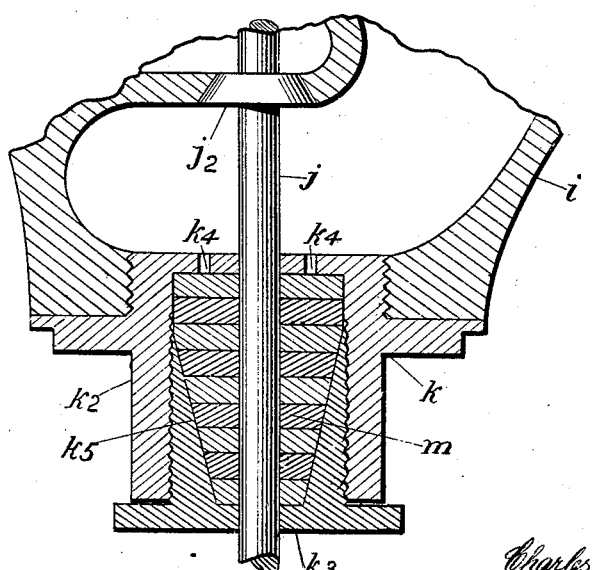

Figure 1 is a sectional side view of a pump cylinder provided with a packing box and packing made according to my invention; and, Fig. 2 a similar view of a part of a steam throttle valve also showing my improvement.

In the drawing forming part of this specification, reference being made to Fig. 1, I have shown at $a$ a pump cylinder provided with a piston $b$ having a rod $b^2$ which passes out through a packing box $c$. The packing box $c$ comprises a base member $c^2$ and glands $c^3$, and placed in the base member $c^2$ is a sleeve $d$ through which the rod $b^2$ passes and the opposite ends of which are beveled interiorly to form conical recesses in which are placed separate layers $e$ of packing material, said material preferably consisting of felt saturated with paraffin or any other suitable material possessing lubricating qualities. The packing $e$, however, may consist of any suitable material and the gland $c^3$ presses on the outer packing as clearly shown in the drawing and its pressure may be regulated by set-nuts $f$. In the interior wall of the base member $c^2$ of the packing box $c$, said interior wall, in the form of construction shown, forming one end of the cylinder $a$, are ports or passages $g$, any desired number of which may be employed and the water or other substance in the cylinder $a$, in the operation of the pump, enters said ports or passages and presses on the inner packing or layers of packing $e$ as will be readily understood, and this operation presses said packing and causes the same to closely fit in the sleeve $d$ and on the rod $b^2$. The gland $c^3$ is also provided with ports or passages $h$ through which the air is free to pass, and in the operation of the pump the air, at a pressure of fifteen pounds to the square inch, operates on the outer packing or layers of packing $e$ and forces the same inwardly, and thus said outer packing or layers of packing are also pressed in the sleeve $d$ on the rod $b^2$.

In Fig. 2, I have shown at $i$ a part of the casing of a steam throttle valve through which passes a rod $j$ provided with a valve $j^2$, and the throttle valve casing $i$ is provided at one or both sides with a stuffing box $k$ composed of a base member $k^2$ and gland $k^3$. In this form of construction, the base member $k^2$ of the stuffing box $k$ is screwed into the valve casing $i$ and is provided with ports or passages $k^4$ any desired number of which may be employed, and the interior of the gland $k^3$ is beveled to form a conical recess $k^5$ in which is placed a packing consisting of separate layers $m$ similar to the packing $e$ in Fig. 1. In the operation of this form of construction, the steam in the valve casing $i$ enters the ports or passages $k^4$ and presses on the layers of packing $m$ and forces said packing into the conical recess $k^5$ and compresses said packing in said recess and on the valve rod $j$ and a perfectly tight packing for said rod is thus produced.

In the construction shown in Fig. 2, the gland $k^3$ of the packing box is screwed into the base member $k^2$ and by means of this construction a result similar to that produced by the nuts $f$ in Fig. 1 is produced, the packing being compressed by screwing in the gland $k^3$.

Constructed as described it will be seen that in the construction shown in Fig. 2, the packing box contains a conical packing chamber through which the rod $j$ passes and the base of which is directed toward the valve casing, and constructed as shown in Fig. 1, the packing box contains two conical chambers the base of one of which is in the direction of the cylinder $a$ while the base of the other is in the opposite or outward direction. It will be apparent that this improvement in packing boxes may be applied to hydraulic apparatus of any kind or class and also to steam apparatus of any kind or class, and various changes in and modifications of the construction described may be made without departing from the spirit of my invention or sacrificing its advantages.

The chief features of my invention consist in the employment of fibrous packing material which is saturated with paraffin or other preservative substance and movable longitudinally in the packing box or casing in which it is placed. This movement of the packing material longitudinally of the box in which it is placed or longitudinally of the piston rod or valve stem which passes therethrough prevents said packing material from becoming solidified and the said material remains in proper condition and may be used much longer than other packings of this class as usually constructed and operated, and the said movement is accomplished by pressure applied to the packing material from the cylinder or casing in connection with which the packing box is employed and by the longitudinal movement of the piston rod or valve stem through said packing material in opposite directions, and when the gland of the box is provided with ports or passages the atmospheric air also aids in accomplishing this movement.

Having fully described my invention, what I claim as new and desire to secure by Letters Patent, is:—

1. A packing box for pump cylinders, valve casings and the like through which is passed a piston rod, valve rod or the like, said packing box being provided with a conical packing chamber the base of which is directed toward the pump cylinder, valve casing or the like and in which is placed compressible fibrous packing material saturated with paraffin or other preservative substance, said material being movable longitudinally of the packing box and being adapted to be moved longitudinally of said box in one direction by pressure applied thereto from the cylinder, valve casing or the like.

2. A device of the class described, comprising a casing provided with a stuffing box and a rod passing therethrough, said stuffing box comprising a base member and a gland member and being also provided with outer and inner conical chambers, said chambers being provided with compressible fibrous packing material, and the base member of the stuffing box being provided with ports or passages which communicate with the interior of the casing and with the chamber adjacent thereto and the gland member being provided with ports or passages which communicate with the chamber adjacent thereto and with the outer air.

3. A packing box for pump cylinders, valve casings and the like provided with two conical packing chambers, the base of one of which is in the direction of the pump cylinder, valve casing or the like and the base of the other in the opposite direction, said chambers being provided with compressible fibrous packing material through which the piston rod, valve rod or the like passes, said packing material being movable longitudinally of the packing box and adapted to be moved and compressed by pressure applied thereto from the pump cylinder, valve casing or the like.

4. A packing box for piston rods, valve rods and the like adapted to be connected with a cylinder, valve casing or the like, said packing box containing compressible fibrous packing material saturated with paraffin or other preservative substance and movable longitudinally of the chamber in which it is placed and through which the piston rod, valve rod or the like passes, said packing material being adapted to be moved longitudinally of the chamber in which it is placed and to be compressed by pressure admitted to the packing chamber from the cylinder, valve casing or the like.

5. A packing box for piston rods, valve rods and the like adapted to be connected with a cylinder, valve casing or the like, said packing box containing compressible packing material movable longitudinally of the chamber in which it is placed and through which the piston rod, valve rod or the like passes, said packing material being adapted to be moved longitudinally of the chamber in which it is placed and to be compressed by pressure admitted to the packing chamber from the cylinder, valve casing or the like, and said packing material being composed of fibrous substance saturated with paraffin or other preservative material.

6. A packing box for piston rods, valve rods and the like adapted to be connected with a cylinder, valve casing or the like, said packing box containing compressible packing material movable longitudinally of the chamber in which it is placed and through which the piston rod, valve rod or the like passes, said packing material being adapted to be moved longitudinally of the chamber in which it is placed and to be compressed by pressure admitted to the packing chamber from the cylinder, valve casing or the like, and said packing material being composed of fibrous substance saturated with paraffin or other preservative material, and the gland of the packing box being provided with ports or passages which communicate with the atmospheric air.

7. A packing box for piston rods, valve rods and the like adapted to be connected with a cylinder, valve casing or the like, said box being provided with a packing chamber in communication with the cylinder, valve casing or the like and being also provided with a gland, a compressible fibrous packing material placed in said chamber and movable longitudinally thereof and adapted to be moved longitudinally thereof and to be compressed by pressure applied thereto from the cylinder, valve casing or the like and said packing material being saturated with paraffin or other preservative substance.

8. A packing box for piston rods, valve rods and the like adapted to be connected with a cylinder, valve casing or the like, said box being provided with a packing chamber in communication with the cylinder, valve casing or the like and being also provided with a gland, a compressible fibrous packing material placed in said chamber and saturated with paraffin or other preservative substance and movable longitudinally thereof and adapted to be moved longitudinally thereof and to be compressed by pressure applied thereto from the cylinder, valve casing or the like, and the gland being provided with ports or passages which communicate with the atmospheric air.

9. A packing box for piston rods, valve rods and the like adapted to be connected with a cylinder, valve casing or the like, said box comprising a base portion and a gland, a packing sleeve movable longitudinally in said box and forming conical chambers in the opposite end portions thereof, and fibrous packing material placed in said chambers, said material being saturated with paraffin or other preservative material, and said sleeve and fibrous material being movable longitudinally of the packing box and the base portion of the packing box being provided with ports or passages in communication with the cylinder, valve casing or the like.

In testimony that I claim the foregoing as my invention I have signed my name in presence of the subscribing witnesses this 19th day of November, 1906.

CHARLES P. McMULLEN.

Witnesses:
C. E. MULREANY,
PAUL BARTELS.